(12) United States Patent
Nelson

(10) Patent No.: US 10,997,548 B2
(45) Date of Patent: May 4, 2021

(54) ITEM ORDERING, PICKUP, AND NOTIFICATION METHODS

(71) Applicant: FoodGarage, LLC, Houston, TX (US)

(72) Inventor: Dommonic Nelson, Spring, TX (US)

(73) Assignee: FoodGarage, LLC, Houston, TX (US)

( * ) Notice: Subject to any disclaimer, the term of this patent is extended or adjusted under 35 U.S.C. 154(b) by 205 days.

(21) Appl. No.: 16/247,248

(22) Filed: Jan. 14, 2019

(65) Prior Publication Data

US 2019/0220815 A1 Jul. 18, 2019

Related U.S. Application Data

(60) Provisional application No. 62/617,060, filed on Jan. 12, 2018.

(51) Int. Cl.
| | |
|---|---|
| *G06Q 30/06* | (2012.01) |
| *G06Q 10/08* | (2012.01) |
| *H04W 4/14* | (2009.01) |
| *G07C 9/00* | (2020.01) |

(52) U.S. Cl.
CPC ..... *G06Q 10/0836* (2013.01); *G06Q 30/0635* (2013.01); *G07C 9/00817* (2013.01); *H04W 4/14* (2013.01)

(58) Field of Classification Search
CPC . G06Q 30/0601–0643; G06Q 10/0836; G07C 9/00817
See application file for complete search history.

(56) References Cited

U.S. PATENT DOCUMENTS

| | | | |
|---|---|---|---|
| 3,089,313 A | 5/1963 | Fix | |
| 6,131,399 A | 10/2000 | Hall | |
| 9,504,344 B2 * | 11/2016 | Sarvestani | G07F 17/12 |

(Continued)

FOREIGN PATENT DOCUMENTS

KR 20170087810 A 7/2017

OTHER PUBLICATIONS

Oxford properties unit uncorks internet hooch; empori.com unit, LCBO in online ordering venture: [ontario edition]. (Jul. 25, 2000). Toronto Star Retrieved from https://dialog.proquest.com/professional/docview/438144704?accountid=131444.*

(Continued)

*Primary Examiner* — Resha Desai
(74) *Attorney, Agent, or Firm* — Craige Thompson; Thompson Patent Law

(57) ABSTRACT

Apparatus and associated methods relate to an online ordering/takeout system for customers to place orders with a variety of merchants, where a customer can let a merchant know that the customer is on their way, and in response, the status of the order is updated in a locker-tracking system. In an illustrative example, a customer device may allow for customers to communicate an in-transit status to the merchant. A merchant device may, for example, allow a customer to gain access to a locker that stores the customer's order. In response to milestone events, such as placing a food item in a locker or the customer indicating they are "on their way," the system may update a status of the locker to reflect a current status of the locker/order. Some embodiments may advantageously provide confirmation to the merchant that the customer is in route to the merchant's location.

22 Claims, 14 Drawing Sheets

(56) References Cited

U.S. PATENT DOCUMENTS

| | | | | |
|---|---|---|---|---|
| 10,580,525 | B2* | 3/2020 | Adams | E05G 1/06 |
| 2001/0045449 | A1* | 11/2001 | Shannon | G07C 9/21 |
| | | | | 232/19 |
| 2002/0154574 | A1 | 10/2002 | Ector, Jr. et al. | |
| 2005/0146419 | A1 | 7/2005 | Porter | |
| 2008/0018210 | A1 | 1/2008 | Hayes | |
| 2009/0228325 | A1* | 9/2009 | Simmons | G06Q 30/0601 |
| | | | | 705/7.23 |
| 2012/0209763 | A1 | 8/2012 | Zabbatino | |
| 2013/0262251 | A1* | 10/2013 | Wan | G06Q 10/08 |
| | | | | 705/26.1 |
| 2016/0049036 | A1 | 2/2016 | Nelson | |
| 2017/0076066 | A1* | 3/2017 | Adams | E05G 1/10 |

OTHER PUBLICATIONS

Kitchen Safe: Time Locking Container (Blue Lid + Clear Base)—5.5' Height, Amazon, n.d. [online], [retrieved on Jan. 14, 2019]. Retrieved from the Internet <https://www.amazon.com/Kitchen-Safe-Locking-Container-Height/dp/B00JGFQTD2>.

Time Lock Safe, Amazon, n.d. [online], [retrieved on Jan. 14, 2019]. Retrieved from the Internet <https://www.amazon.com/Time-Lock-Safe/dp/B00NFIDTMK>.

KSafe, Kitchen Safe, n.d. [online], [retrieved on Jan. 14, 2019]. Retrieved from the Internet <https://www.thekitchensafe.com/>.

DaysAgo Digital Refrigerator Timers, The Green Head, n.d. [online], [retrieved on Jan. 14, 2019]. Retrieved from the Internet <https://www.thegreenhead.com/2007/08/daysago-refrigerator-digital-timers.php>.

Henry Blodget, Here's a Picture of Amazon Locker, The New Delivery Box Amazon Is Using to Take Over the World, Business Insider, Aug. 24, 2012 [online], [retrieved on Jan. 14, 2019]. Retrieved from the Internet <https://www.businessinsider.com/amazon-locker-2012-8>.

Amazon Locker, Amazon, n.d. [online], [retrieved on Jan. 14, 2019]. Retrieved from the Internet <https://www.amazon.com/b?node=6442600011>.

Apex Introduces New Self-Serve Locker Applications for Restaurants, Business Wire, May 21, 2016 [online], [retrieved on Jan. 14, 2019]. Retrieved from the Internet <https://www.businesswire.com/news/home/20160521005014/en/Apex-Introduces-New-Self-Serve-Locker-Applications-Restaurants>.

Learn More About Apex Order Pick-Up Technologies, Apex, n.d. [online], [retrieved on Jan. 14, 2019]. Retrieved from the Internet <https://www.apexsupplychain.com/markets/foodservice/>.

Explore Our Lockers, Luxer One, n.d. [online], [retrieved on Jan. 14, 2019]. Retrieved from the Internet <https://www.luxerone.com/>.

Laura Kusisto and Laura Stevens, Amazon Locks Up Delivery Deal, The Wall Street Journal, Oct. 18, 2017 [newspaper], 1 page.

* cited by examiner

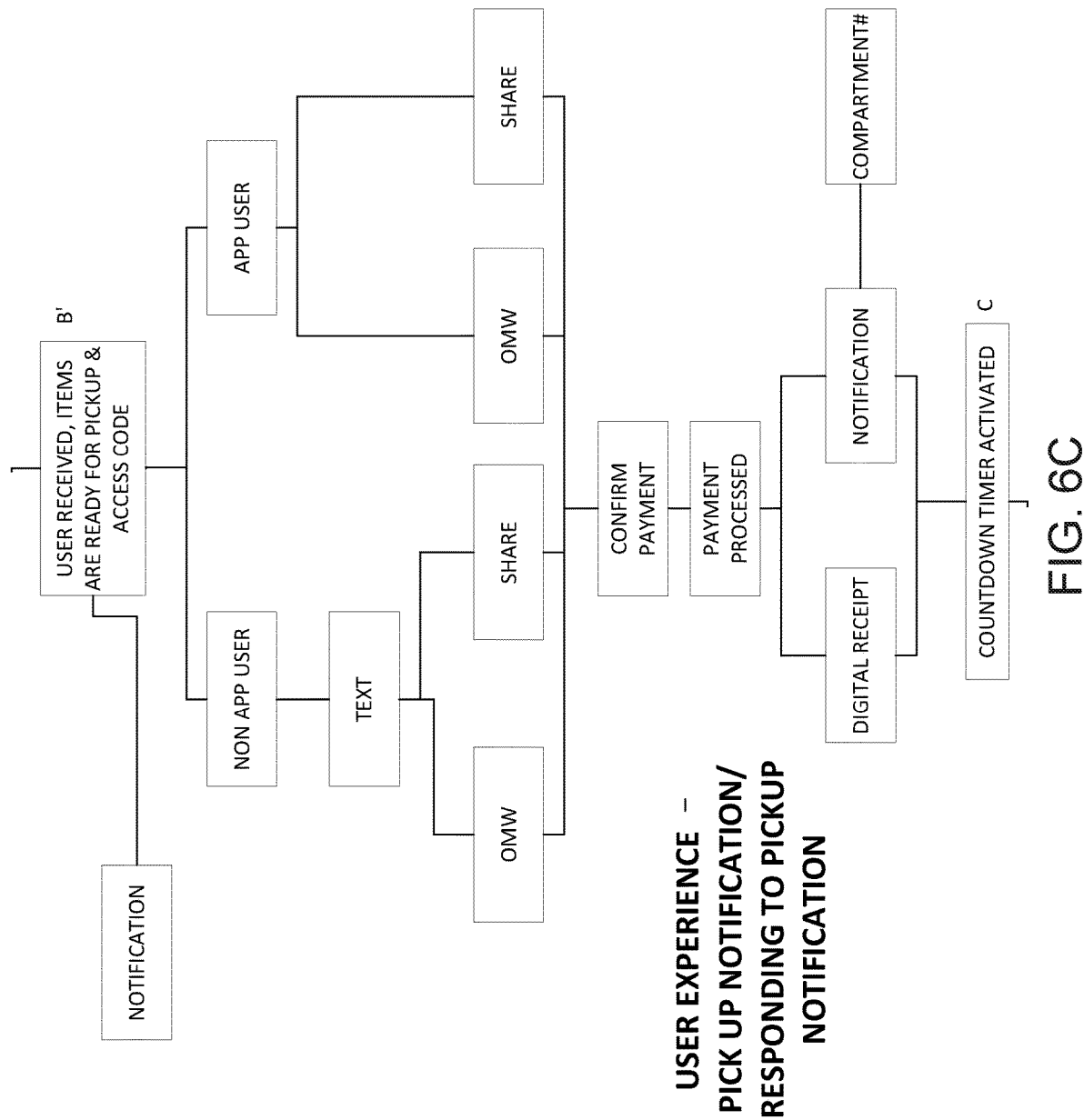

ITEM ORDERING, PICKUP, AND NOTIFICATION METHODS

CROSS-REFERENCE TO RELATED APPLICATIONS

This application claims the benefit of U.S. Provisional Application Ser. No. 62/617,060 titled "Item Ordering, Pickup, and Notification System," filed by Dommonic Nelson, on Jan. 12, 2018.

This application incorporates the entire contents of the foregoing application(s) herein by reference.

TECHNICAL FIELD

Various embodiments relate generally to placing orders using electronic devices.

BACKGROUND

In the past, humans acquired sustenance through the practice of foraging and hunting. A forager may look for plants that produce edible food, such as nuts, berries, or fruit. A hunter may track various animals to consume their meat and make clothing from the animals' fur. With the advent of agriculture, humans began to harvest food from planted crops. Ranching also allowed humans to domesticate animals in an enclosed space for consumption. The farming and ranching lifestyle replaced the foraging and hunting lifestyle for many humans.

As civilization further developed, people began to live in larger towns and cities that had higher population densities. In these cities, many people began to acquire food and drink indirectly from farms and ranches. These people no longer lived directly from the land, but rather, acquired food and drink from establishments such as grocery stores, restaurants, and farmers markets. More recently, grocery delivery services have started delivering food and drink directly to customer's residences (e.g., AmazonFresh, DoorDash).

SUMMARY

Apparatus and associated methods relate to an online ordering/takeout system for customers to place orders with a variety of merchants, where a customer can let a merchant know that the customer is on their way, and in response, the status of the order is updated in a locker-tracking system. In an illustrative example, a customer device may allow for customers to communicate an in-transit status to the merchant. A merchant device may, for example, allow a customer to gain access to a locker that stores the customer's order. In response to milestone events, such as placing a food item in a locker or the customer indicating they are "on their way," the system may update a status of the locker to reflect a current status of the locker/order. Some embodiments may advantageously provide confirmation to the merchant that the customer is in route to the merchant's location.

Various embodiments may achieve one or more advantages. For example, knowing the estimated time of arrival (ETA) of a customer may advantageously allow for a merchant to adapt the merchant's operations accordingly. Providing information for the merchant to confirm the identity of the second person/entity may advantageously reduce the number of fraudulent pickups by unauthorized persons. Providing only authorized customers with a locker access code to retrieve their order may advantageously allow for secure storage of the customer's order inside a locker located in a public, semi-public, or semi-private area. In various examples, customers may advantageously only need to show up at a merchant's location when orders are actually ready. Some examples may provide a user interface for merchants (and related employees) to examine a current status of all food orders stored within a locker system, such that the merchant may beneficially keep track of the status of all orders using a single dashboard display. Various embodiments may alert merchants to orders that have been stored in a locker longer than a predetermined time period (e.g., 20 minutes). Exemplary embodiments may beneficially provide for an improvement in the technical field of computerized online ordering for merchant's to more efficiently track and manage order for customers.

The details of various embodiments are set forth in the accompanying drawings and the description below. Other features and advantages will be apparent from the description and drawings, and from the claims.

BRIEF DESCRIPTION OF THE DRAWINGS

FIGS. 6A, 6B, 6C, 6D, and 6E depicts flowcharts of an exemplary computer implemented method for coordinating retrieval of a perishable item at a merchant location.

Like reference symbols in the various drawings indicate like elements.

DETAILED DESCRIPTION OF ILLUSTRATIVE EMBODIMENTS

Figure 1:
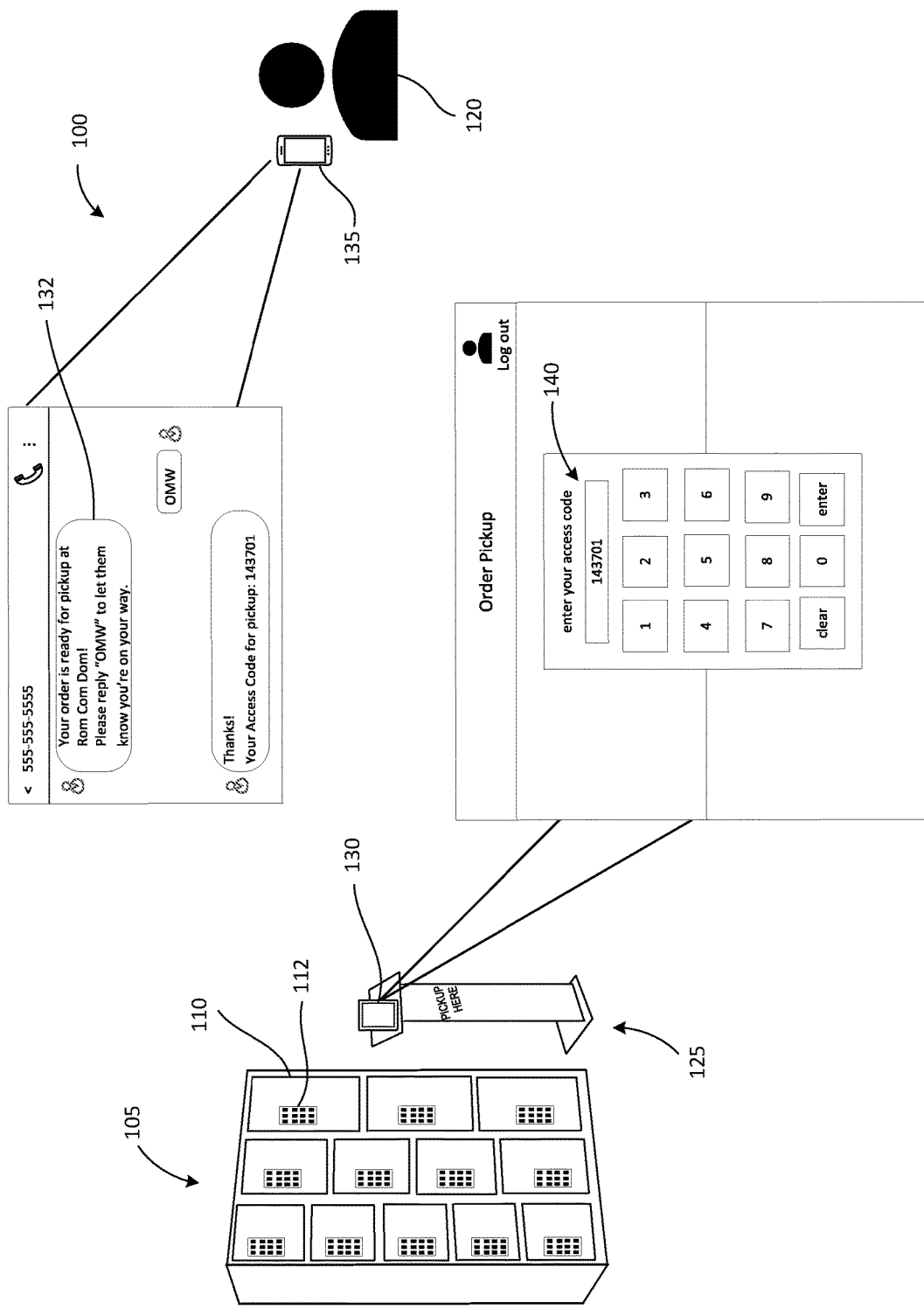
FIG. 1 depicts a perspective view of an exemplary perishable item ordering and retrieval scenario.

FIG. 1 depicts a perspective view of an exemplary perishable item ordering and retrieval scenario. A scenario 100 includes a locker system 105. The locker system 105 may be located at a merchant's location, such as at a restaurant, for example. The locker system 105 includes a locker 110 having an access interface 112 (such as a keypad or NFC scanner), for example, for gaining access to the contents of that specific locker. Stored in various lockers 110 of the locker system 105 are perishable items (e.g., perishable food or drink items). An employee (e.g., a food runner) of the merchant may place the various items into the individual lockers 110 for pickup by a customer 120. Located in the vicinity of the locker system 105 is a kiosk 125. The kiosk 125 may include an electronic computing device 130, such as a touchscreen tablet computer, for example. The employee may use the kiosk 125 to keep track of items stored within the lockers 110, and manage the real-time status of these orders. Once an employee has placed an item in a locker 110, the kiosk 125 may send a command to transmit a message 132 to a customer's electronic device 135. The message 132 may indicate that the customer's order is ready, and may prompt the customer for information about the arrival time of the customer at the merchant's location. For example, the message may request that the customer 120 send a reply message indicating that the user is presently in route to the merchant's location (e.g., by saying "on my way" or "OMW"). A status of that order and associated locker may then be updated to reflect the fact that the customer is on their way to the merchant's location to retrieve their items from the corresponding locker. Once the customer arrives at the merchant's location, they may use the kiosk 125/computing device 130 to enter in an access code 140 which gives the customer access to the specific locker 110, thus allowing the customer to retrieve their order items from the locker 110. In some examples, once the customer arrives at the merchant's location, they may use the kiosk 125/computing device 130 to enter in an intermediate access code 140, which may give the customer the corresponding locker number and pin code for that locker number, which may in turn, allow the customer access to the specific lockers. This embodiment may be a "double verification security measure," which may require two codes/pins/passwords to access the contents of the customer's locker. Accordingly, the scenario 100 illustrates how a merchant may be kept up to date regarding the status of their orders by utilizing feedback information (e.g., the employee placing the item in the locker and/or the customer indicating they are in route) to track the status of orders in (near) real-time. Furthermore, the status of an order may also change when the order is picked up by the customer (this feature is explained further in depth below).

In some examples, an employee may use an alternative to the kiosk 125 to keep track of items stored within the lockers 110, and manage the real-time status of these orders. For example, the employee may keep track of and manage the lockers/order from an electronic device, or from a website from afar. Employees may not need be physically located near locker systems to view statuses. For example, employees may have additional digital tablet that they could be kept at a cash register to be able to view statuses from afar. Also, management may be able to view statuses from a computer by access to an administrator panel via a website served by a server.

Figure 2:
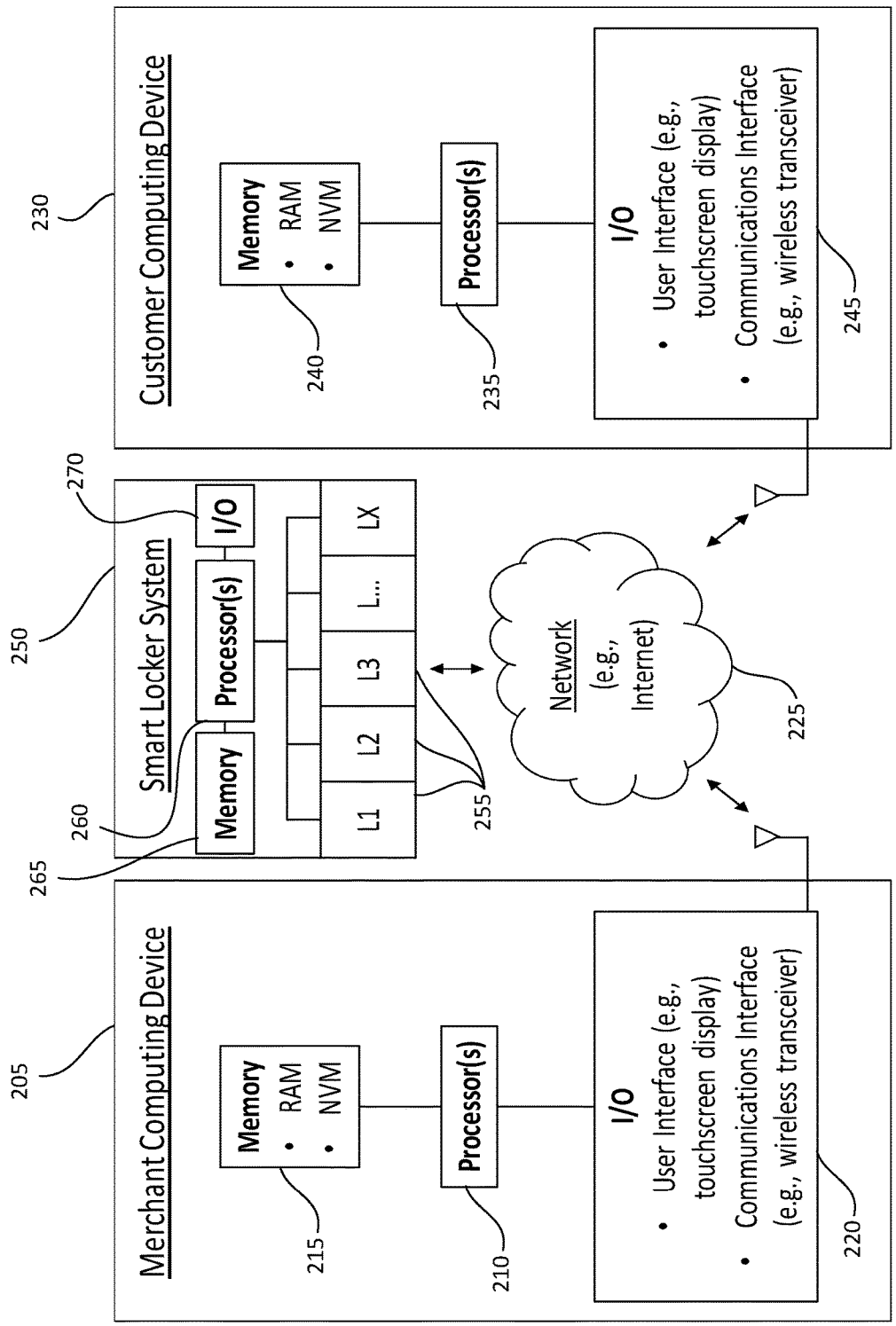
FIG. 2 depicts a block diagram view of an exemplary perishable item ordering and retrieval system.

FIG. 2 depicts a block diagram view of an exemplary perishable item ordering and retrieval system. A merchant computing device 205 includes at least one processor 210, memory 215 (which may include volatile (RAM) and non-volatile (NVM) memory), and input/output (I/O) 220. The I/O 220 may include, for example, a user interface, such as a touchscreen display, and a communications interface, such as a wireless transceiver. The memory 215 may store instructions that when executed by the processor(s) 210, cause the processor(s) to execute operations for coordinating retrieval of a physical item (e.g., 115) at a physical location (e.g., 105). In some examples, the device 205 may be the same computing device 130 shown in FIG. 1.

In operable communication with the merchant computing device 205 (e.g., over a network 225), is a customer computing device 230. In some examples, the customer computing device 230 may be a smartphone, such as an IPhone®, for example. The customer computing device 230 includes at least one processor 235, memory 240 (which may include volatile (RAM) and non-volatile (NVM) memory), and input/output (I/O) 245. The I/O 245 may include, for example, a user interface, such as a touchscreen display, and a communications interface, such as a wireless transceiver.

In various examples, a smart locker system 250 may be employed. The smart locker system 250 includes a plurality of lockers 255. Operably coupled to each of the lockers 255 is at least one processor 260. The smart locker system 250 further includes memory 265 (RAM/NVM) and I/O 270. In some embodiments, the processor(s) 260, memory 265, and I/O 270 may be the same processor(s) 210, memory 215, and I/O 220 of the merchant computing device 205. The processor(s) 260 are operably coupled to (each of the) lockers 255. The memory 265 may include instructions that when executed by the processor(s) 260, cause the processor(s) to perform operations to control, operate, program, and/or manage the lockers 255. For example, the memory/processor(s) may configure an access code for each of the lockers 255.

Figure 3A:
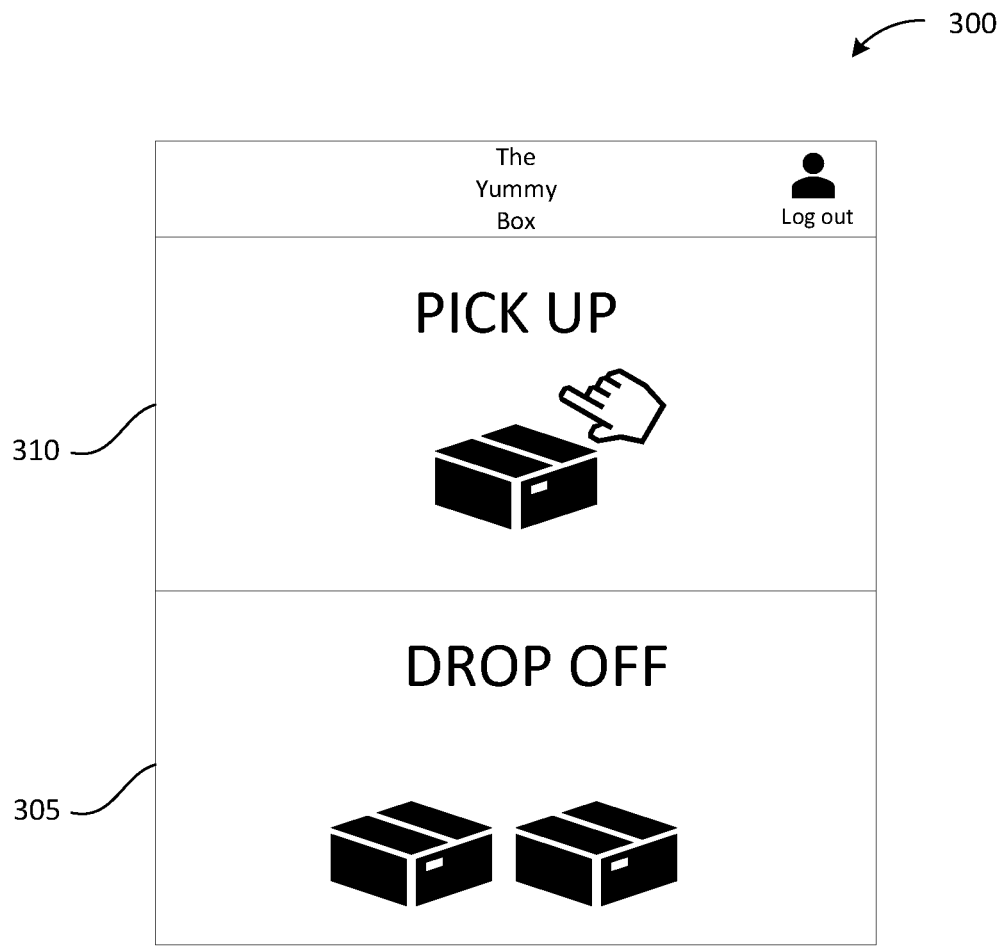
FIG. 3A depicts a screenshot of an exemplary user interface for picking up and/or dropping off food or packages.

FIG. 3A depicts a screenshot of an exemplary user interface for picking up and/or dropping off food. A screenshot 300 includes a drop off selection option 305 (used by the employees/food runners of the merchant/restaurant), and a pick up selection option 310 (used by the customers of the merchant/restaurant). For example, if a food runner is ordered to load items for a specific order into a locker, the food runner may select the "drop off" option, while if a customer desires to retrieve their items from a locker, they may select the "pick up" option. The screenshot 300 may be displayed on a display screen of a computing device, for example, the merchant computing device 205 and/or the electronic computing device 130.

Figure 3B:
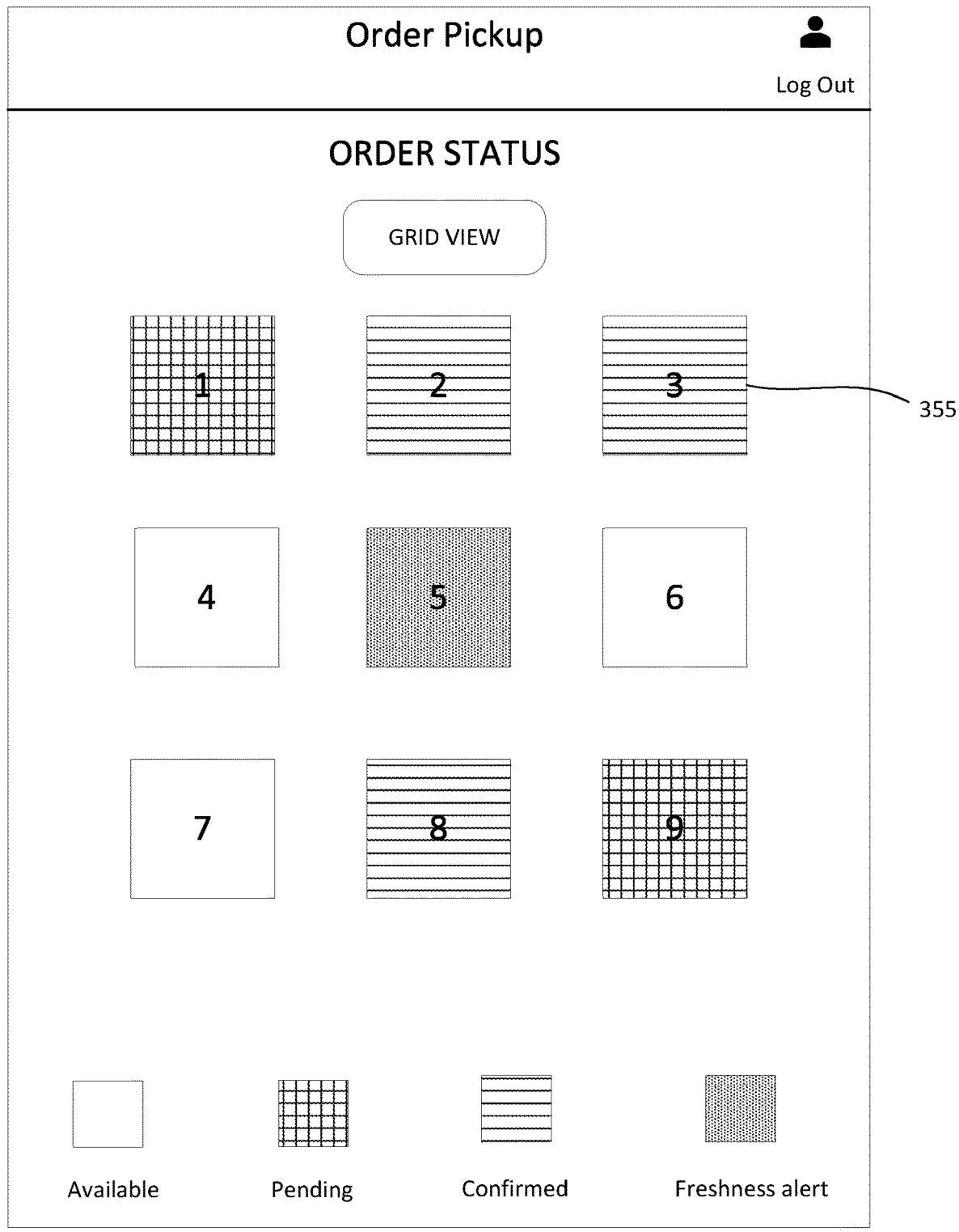
FIGS. 3B and 3C depicts screenshots of an exemplary user interface for storing food in an assigned locker for pickup by a customer.
Figure 3C:
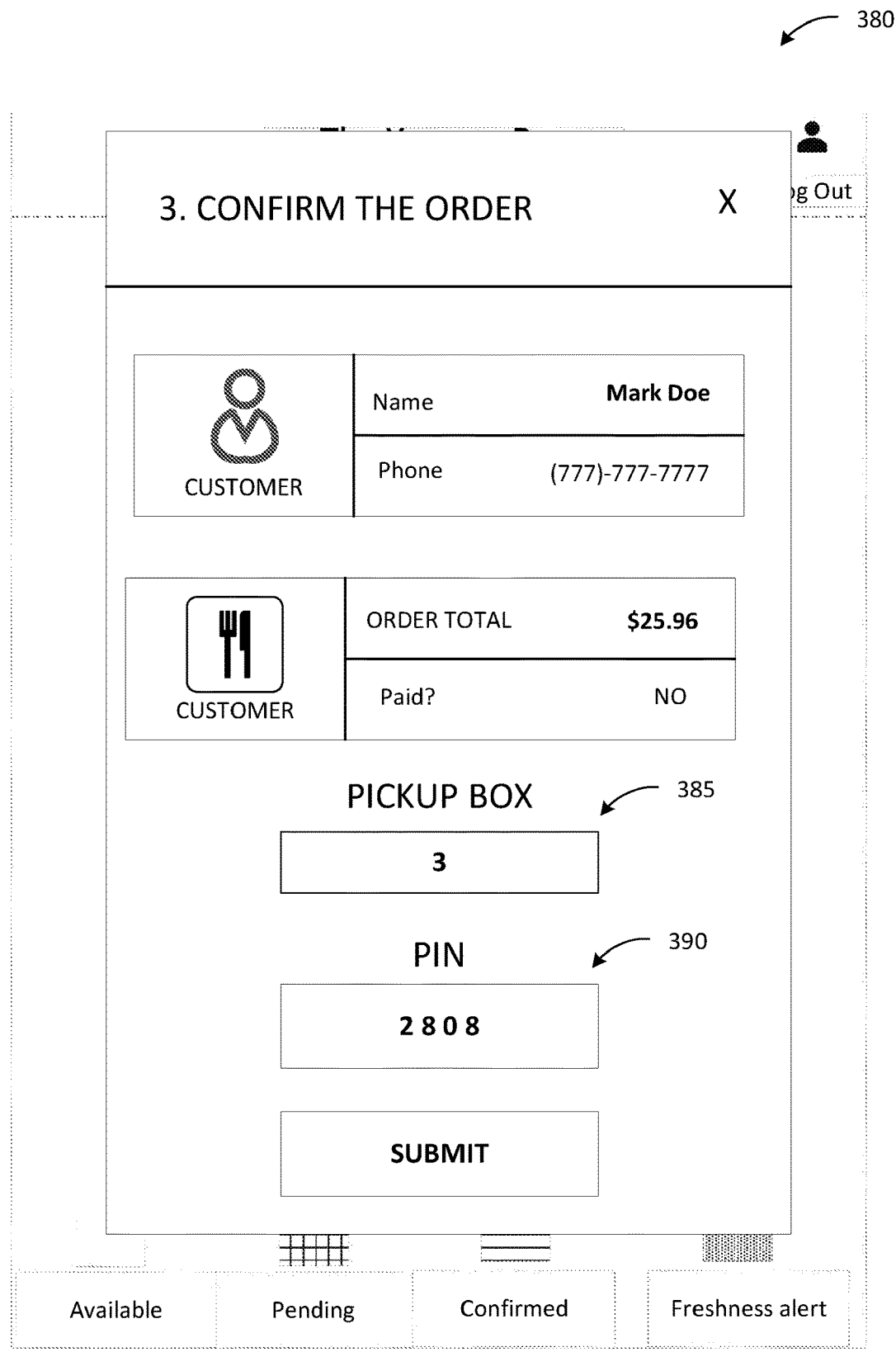

FIGS. 3B and 3C depicts screenshots of an exemplary user interface for storing food in an assigned locker for pickup by a customer. FIG. 3B shows a locker status screen 350 that indicates the status 355 of each of the merchant's lockers (e.g., lockers 1-9). In this illustrative example, a color is used to indicate a given locker's status. For example, the status indicator may indicate whether a locker is (1) available (green), (2) occupied/pending (grey), (3) associated with a customer that has confirmed they are in route (blue), or (4) contains an expired/low freshness order (orange). In some examples, an indication may also be used to indicate whether a locker contains a non-expired item (e.g., a purple color indicator may signify that items have been dropped off at a specific locker). Each locker at the merchant's location may be displayed on the locker status screen, along with its associated status (e.g., available, confirmed, occupied, expired). In some embodiments, the locker status screen may only be accessible to merchant-side users (e.g., the merchant's food runner or administrator).

FIG. 3C depicts a verify order screen 375 where a food runner can verify the details of a customer's order. A merchant (or their employee) may input various details of an order 380 into the device 130, which may include, for example, a customer's name, phone number, order total, and whether the order has already been paid for. In response to inputting this information, the device 130 may automatically assign an available locker 385 (in this case, locker/box 3), and may display an associated access code 390 for that locker (in this case, code 2808). A person may then input the access code 390 into the given locker (via, e.g., a keypad), which will cause the locker to open, thus allowing the person to retrieve the contents stored in that locker.

Figure 4A:
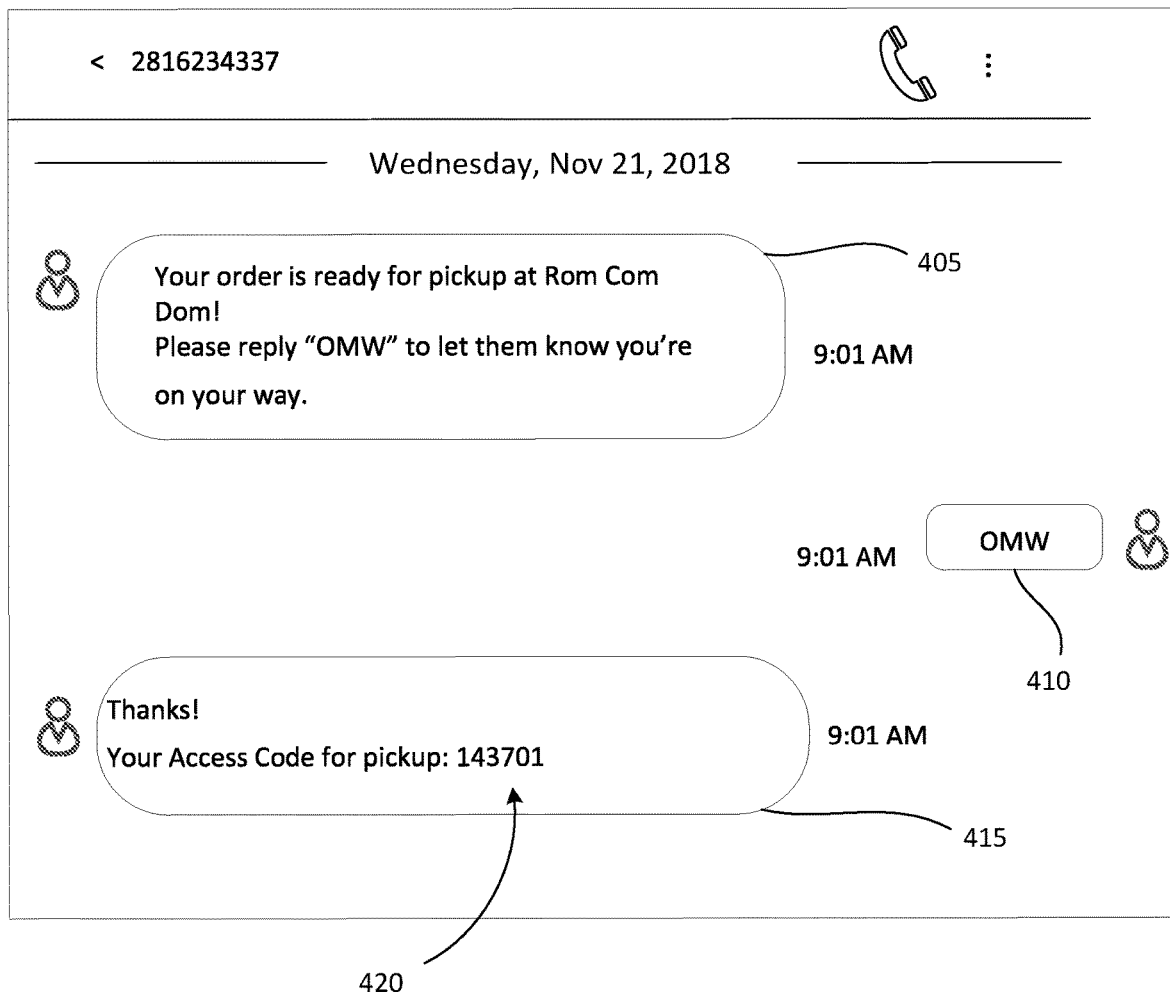
FIGS. 4A and 4B depicts screenshots of an exemplary user interface for a customer's electronic device receiving a notification that their order is ready for pickup, and requesting that the customer indicate whether they are in route to the associated merchant location.
Figure 4B:
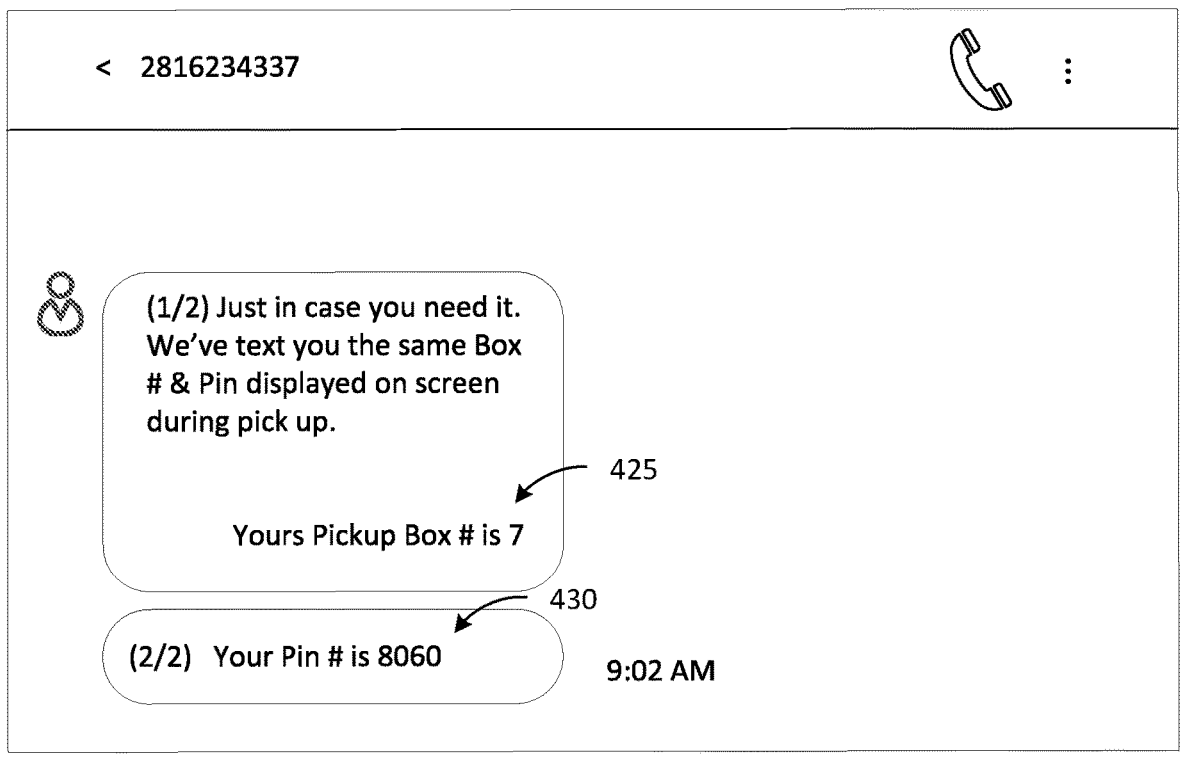

FIGS. 4A and 4B depicts screenshots of an exemplary user interface for a customer's electronic device receiving a notification that their order is ready for pickup, and requesting that the customer indicate whether they are in route to the associated merchant location. A screenshot 400 includes a notification/request message 405. The message 405 may be sent (automatically) by the electronic device 130, for example, upon assignment of an order to a specific locker. The message 405 may alert the customer that their order is ready for pickup, and prompt the user for a reply message indicating when/that they are in route to pick up their order from their assigned locker. In response to the message 405, a customer may respond with a customer reply message 410 indicating that they are in route. For example, the user may reply "on my way" or "OMW," which may be received by the device 130. Upon receiving this indication, the device 130 may send a reply message 415 to the customer providing the customer with an access password 420. The access password 420 may be input by the customer into the electronic device 130 upon arrival by the customer at the merchant's location. In response to receiving a valid access password 420, the electronic device 130 may display a locker number associated with the customer's order, along with an access code that the customer may use to gain access to the locker associated with the customer's order. In some examples, upon receiving the "omw" reply, the electronic device 130 may send to the customer's device an access code 425 along with the corresponding locker number 430 associated with the customer's order (see, e.g., screenshot 435 in FIG. 4B).

Figure 5A:
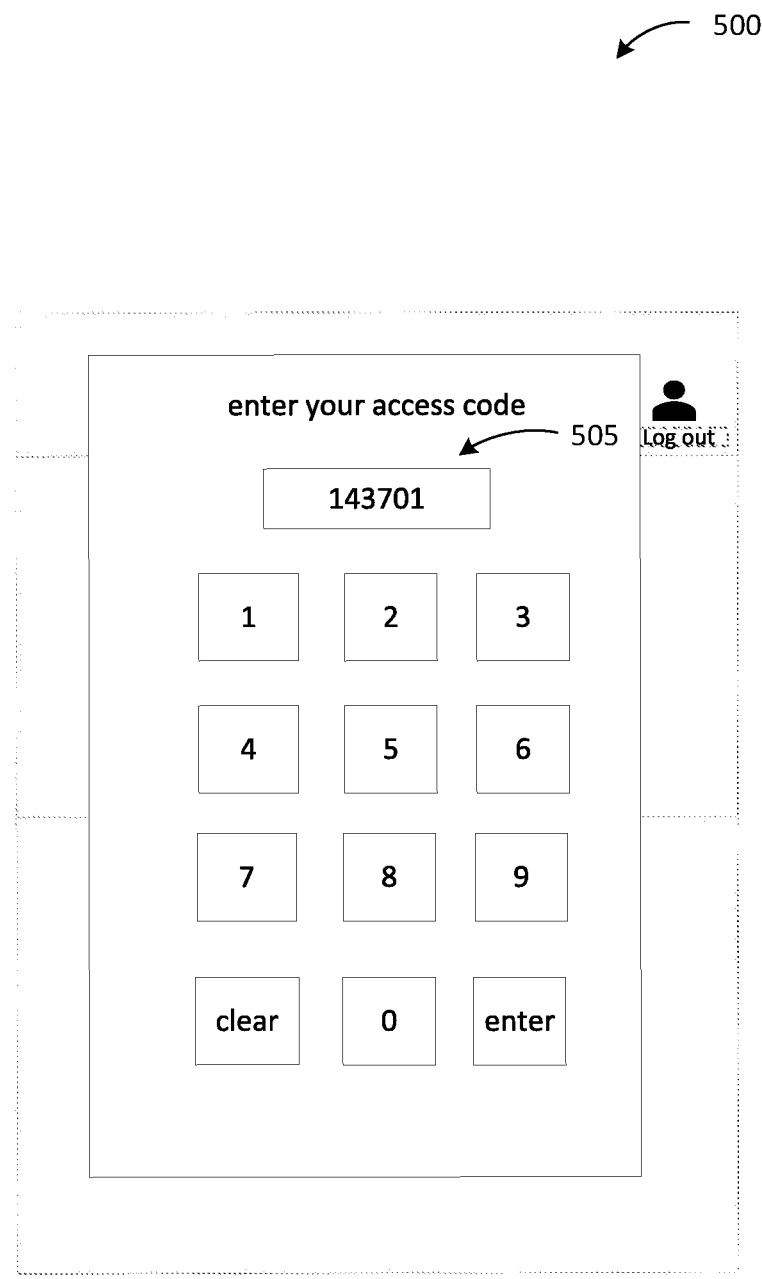
FIGS. 5A and 5B depicts screenshots of an exemplary user interface for a customer to gain access to, and retrieve items from, an assigned locker that presently stores the items associated with the customer's order.
Figure 5B:
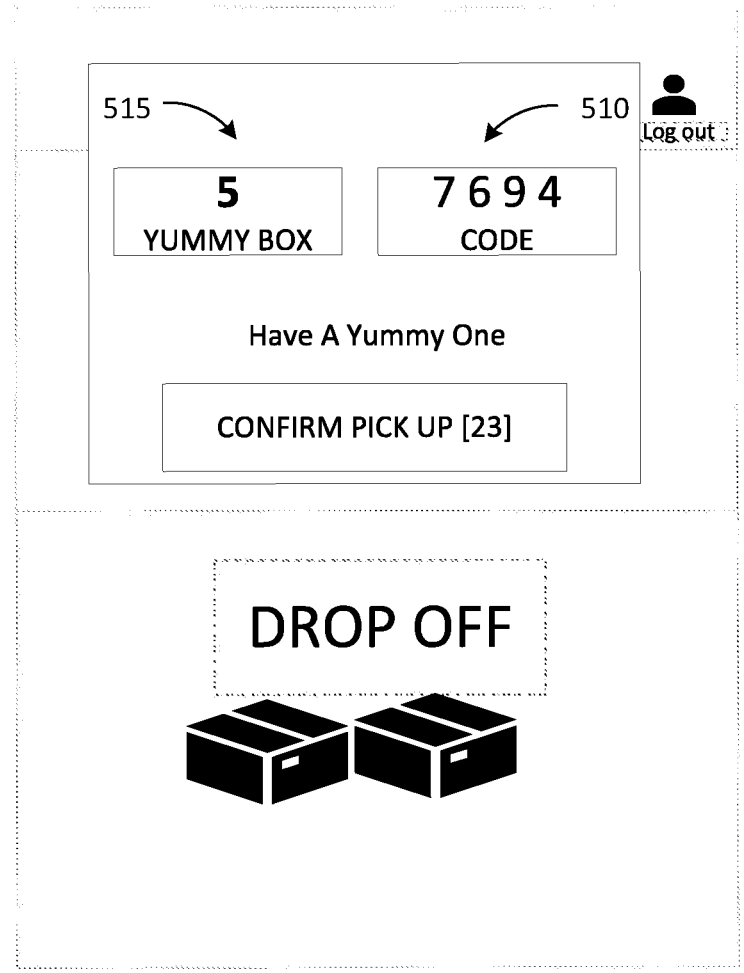

FIGS. 5A and 5B depicts screenshots of an exemplary user interface for a customer to gain access to, and retrieve items from, an assigned locker that presently stores the items associated with the customer's order. A screenshot 500 may be taken from the electronic device 130. The screenshot 500 prompts 505 a customer for their access password (e.g., password 420). In response to the customer inputting a valid access password, the electronic device 130 may display an access code 510 along with the corresponding locker number 515 (in this case, locker/box 5) associated with the customer's order. Upon viewing this information, the customer may then walk over to the assigned locker, input the access code to open the locker, and then retrieve their order items from the locker.

FIGS. 6A, 6B, 6C, 6D, and 6E depicts flowcharts of an exemplary computer implemented method for coordinating retrieval of a perishable item at a merchant location. The flowchart shown in FIGS. 6A-6E starts with FIG. 6A and ends with FIG. 6E, with the process links between each figure being represented by capitalized letters (e.g., A in FIG. 6A continuing to A' in FIG. 6B, etc.).

Figure 6A:
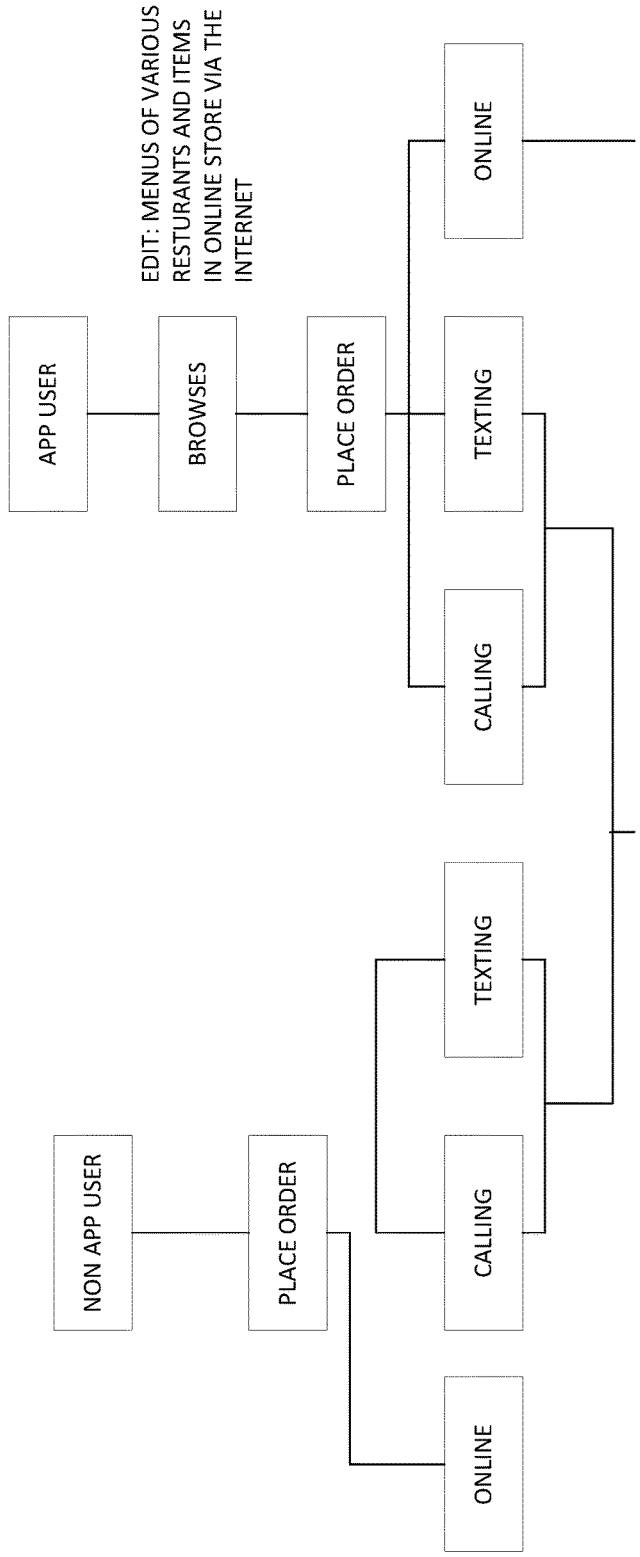
Figure 6A:
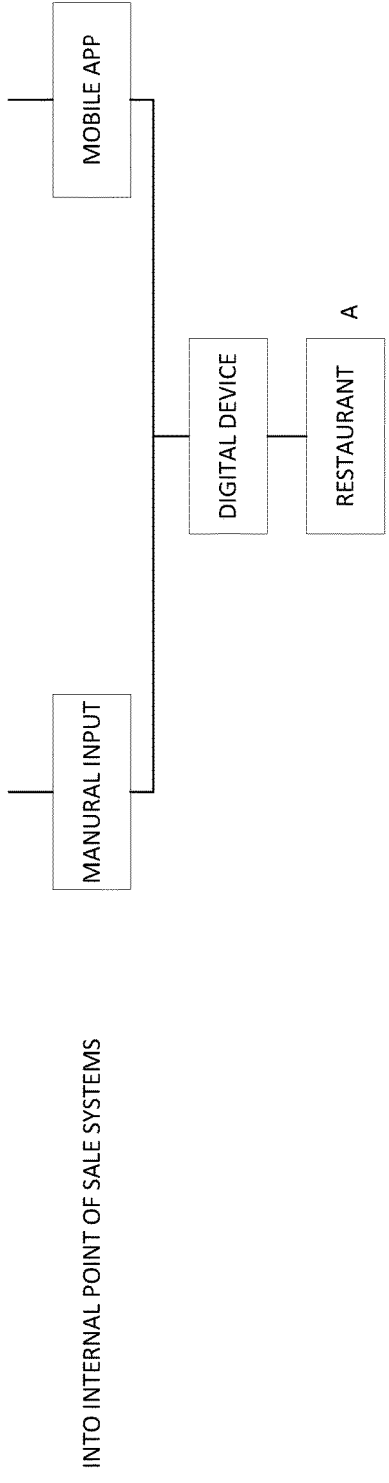

In FIG. 6A, an exemplary ordering and pickup process 600 starts with a customer (e.g., user) initiating an order using their customer device. The customer places an order, for example, via phone call, text, or the Internet (online). The merchant (e.g., restaurant) then receives the customer's order into their internal point of sale (POS) system. In some embodiments, an employee of the merchant (e.g., a food runner) may manually input the order into the merchant's POS system.

Figure 6B:
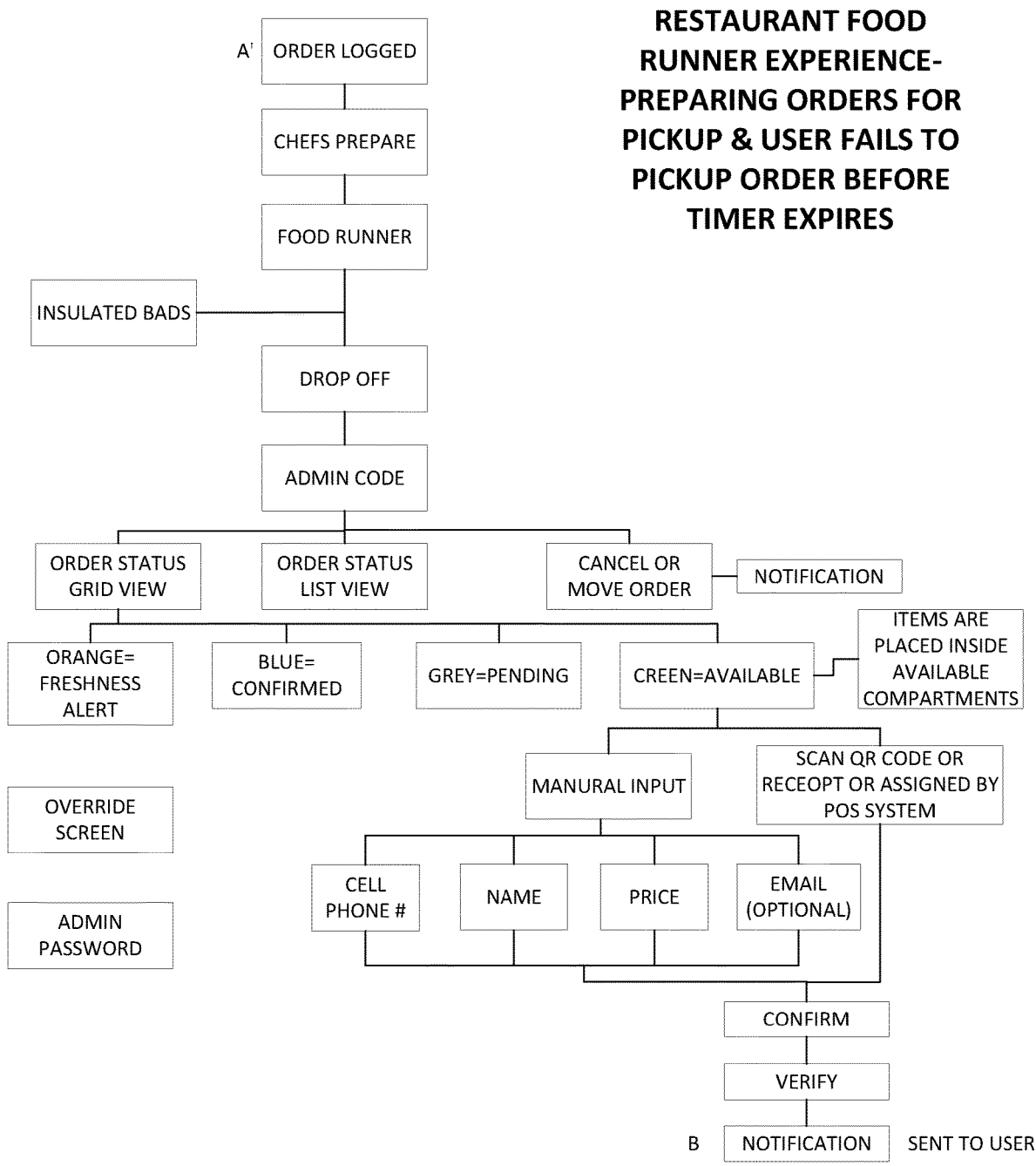

In FIG. 6B, the exemplary ordering and pickup process 600 continues with the customer's order being logged, and the merchant's food/beverage preparation employees (e.g., chefs) preparing the items ordered by the customer. The food runner then retrieves the ordered items. The food runner then uses an administrative code to unlock an available locker (e.g., locker 110) if available locker is locked. After a selected available locker, has been unlocked and/or opened, the food runner places the items (e.g., food/drink) into the selected locker and shuts the door to the locker, to arm the locker door the food runner enters the (random number) access code (390), thereby securely locking the items inside of the selected locker to await customer pick-up.

The merchant device 130 may dynamically indicate the status of each individual locker. For example, when a locker is not currently being used (e.g., unoccupied), the merchant device 130 may indicate that the locker is available (e.g., by displaying the locker with a green color). In some examples, when the food runner places the items in a selected locker (drop-off), the merchant device 110 may indicate that the locker is now occupied and/or that the order is now pending (e.g., by displaying the selected locker with a grey color). The merchant's employee may view the current status of all orders and associated lockers using an order status grid view (FIG. 3B). Once a customer provides confirmation to the merchant that the customer is on their way, the merchant device 110 may indicate that the customer has confirmed they are in route (e.g., by displaying the selected locker with a blue color).

In some examples, if a predetermined amount of time has passed after the food runner has placed the items inside the selected locker without pickup by the customer, a freshness timer may expire (or pickup timer may expire). Expiration of this timer may cause the merchant device 110 to indicate that the order for the selected locker has expired and/or is no longer fresh (e.g., by displaying the selected locker with an orange color). This may alert a food runner that the order may need additional attention (e.g., may require a call to the customer). In some examples, the food runner may be able to override an expired order by, for example, using an admin password. Overriding an expired order may reset the compartment status to, for example, occupied status.

In some examples, if a customer cancels an order, the merchant device 110 may indicate that the order placed in a selected locker has been cancelled (e.g., by showing a blinking red screen). This may alert a food runner that the order must be removed from the selected locker. In some examples, the food runner may be able to override a cancelled order by, for example, using an admin password. Overriding a cancelled order may reset the compartment status to, for example, occupied status. Locker status updates or changes may be controlled/altered by both by food runner and administrator. Customer and programmed status updates may be completed automatically by a non-downloadable software application.

For example, a food runner may place an item in a locker (e.g., green=available), may enter a customer's contact information, and may click the send button, which automatically (via, e.g., the non-downloadable software application) changes the status from available (e.g., green) to pending (e.g., black or grey). When the customer clicks the "OMW" button or text "OMW," the locker status may update (e.g., to yellow) and may activate the predetermined timer. If an order expires, the status of the locker may then turn another color (e.g., red or orange). If an order is canceled, a food runner/administrator may remove the items and may reset the locker to available (e.g., green).

Before or after placing items in a selected locker, the food runner may assign the selected locker to a customer. Assignment of a locker to a customer may be done by, for example, scanning a QR code printed out on a receipt that encodes prefilled information corresponding to the customer (e.g., the customer's phone number, email, or name). In some examples, the assignment of a locker to a customer may be done manually by, for example, inputting customer information into the merchant device 110 (e.g., the customer's phone number, email, and/or name). In some examples, the assignment of a locker to a customer may be done automatically by integration with the merchant's point of sale (POS) system. After a selected locker has been assigned to a customer and the customer's order has been placed in the selected locker, the merchant device 110 may confirm and/or verify the assignment. In various examples, it is at this point that a freshness timer (or pickup timer) for the selected locker may start, which may change the status of the selected locker to expired once the freshness timer (or pickup timer) expires. In some examples, the freshness timer may be set to a predetermined time regardless of the type of order (or it may be dependent upon the order/item(s) type). In some embodiments, the freshness timer may be customized to, for example, the type of order or the ETA of a customer. Next, the merchant may send a notification to the customer device to let the customer know that the order has been placed in a locker and is ready for pickup.

In FIG. 6C, the exemplary ordering and pickup process 600 continues with the customer receiving the notification that their order has been placed in a locker and is ready for pickup (see, e.g., FIG. 4A). In various examples, it is at this point that a freshness timer (or pickup timer) for the selected locker may start, which may change the status of the selected locker to "not fresh" once the timer expires. Upon receipt of this notification, the customer may be prompted, for example, to indicate whether the customer is on their way.

Next, the customer may be requested to confirm payment, which may then be processed. The customer may then receive a digital receipt, along with a notification of the locker number corresponding to the customer's order (see, e.g., FIG. 4B). Customers with unpaid orders may be prompted to pay at kiosk device before receiving their access code to continue the pickup process. The locker number corresponding to the customer may be presented at time of pick up after the customer has entered information (e.g., customer's phone number and/or access code) associated with their order, which may help with security of each locker. Upon successful processing of payment, the status of the selected locker (as indicated on the merchant device 110) may be updated to indicate that the customer has confirmed pick up (e.g., by displaying the selected locker with a yellow or blue color). In various examples, it is at this point that a freshness timer for the selected locker may start, which may change the status of the selected locker to "not fresh" once the timer expires. If the customer doesn't respond to an initial notification of items being ready for pick up, the electronic device 130 may send a second notification alert (e.g., call, text, native notification) after a predetermined time. If customer fails to notify that they're on their way after a predetermined number of failed attempts, the customer order may be cancelled, and the locker status may update to red, for example.

The following is an illustrative example of the process: "Confirm Pickup" may be located on merchant device. A customer may select "Confirm Pickup" after removing their items from locker. Selection of "Confirming Pickup" may reset the locker status to available (e.g., green). In some examples, "Confirming Pickup" could be titled by other names (e.g., finished, done, or complete). "OMW" may be selected on the customer device. Once the customer confirms they're on their way (OMW), the locker status may be automatically updated from pending (e.g., grey) to confirmed (e.g., blue). An online timer may start when a merchant notifies customer that their order is ready and/or when customer notifies restaurant they're on their way. The customer may or may not be made aware of timer. Timer may be working on the back-end and used to better control takeout orders and maximize food quality.

Figure 6D:
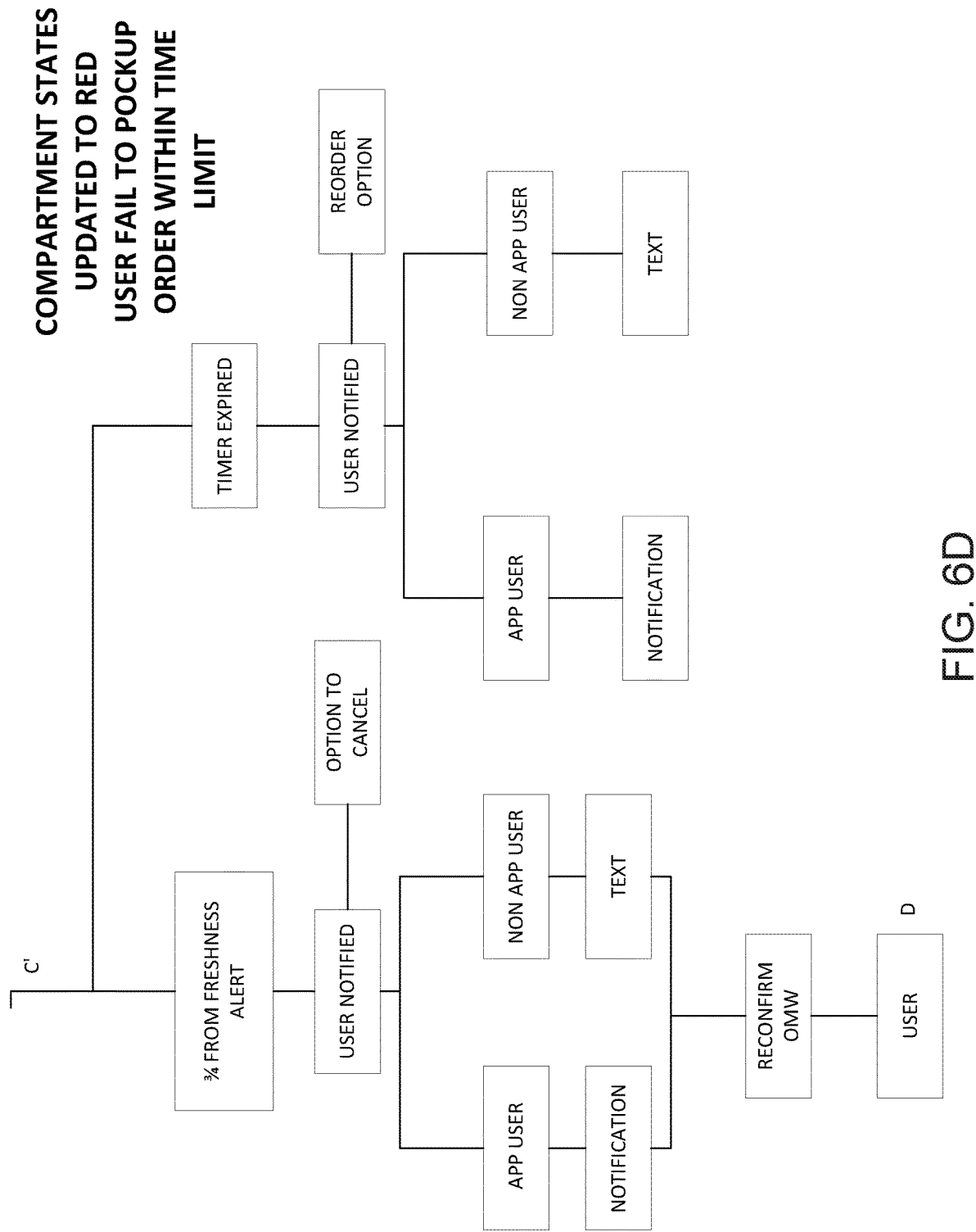

In FIG. 6D, the exemplary ordering and pickup process 600 continues with the freshness timer for the selected locker counting down. When the timer reaches, for example, ¾ of the time to expiration, the customer may be notified that their order is nearing "no longer fresh" status, and may be provided with an option to cancel the order. The customer may then be able to (re-)confirm that they are on their way, which may increase the number of minutes remaining on the predetermined timer. Once the timer expires, the selected compartment status is updated to indicate the customer's order has expired (e.g., by displaying on the merchant device 110 the selected locker with a red color). For an expired order, the customer may be notified that their order is expired, and may also be presented with a reorder option.

Figure 6E:
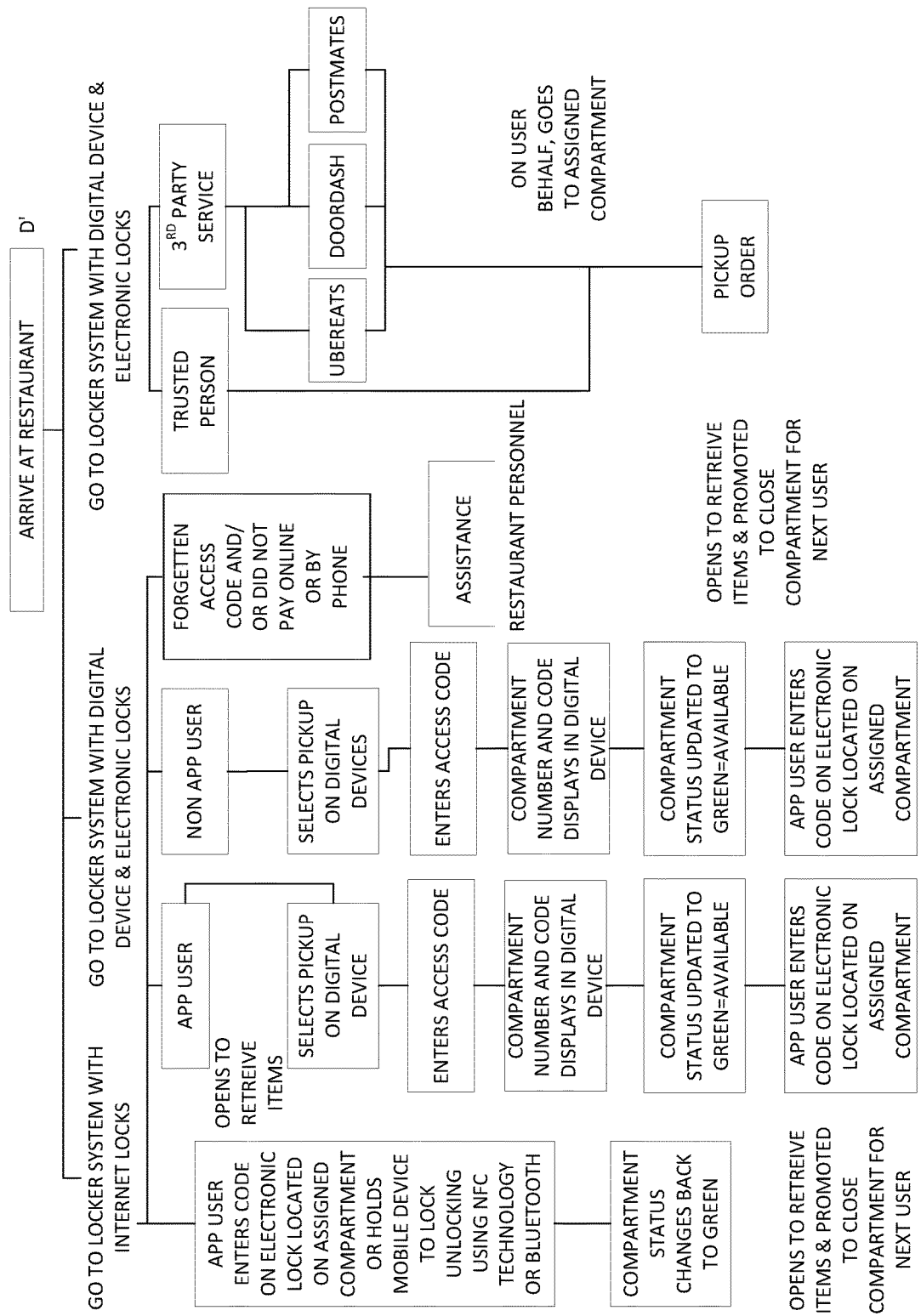

As shown in FIG. 6E, after placing the order, the customer may travel to the merchant's location for pickup (e.g., arrive at the restaurant). The customer may then input the access code into the code entry interface (keypad) of the locker corresponding to the customer's order, thereby allowing the customer to retrieve their order from the locker. After the order has been retrieved by the customer, the customer may be prompted to close and lock the locker after retrieval. At this point (and/or once the customer clicks "confirm pickup" or the "confirm pickup timer" expires), the status of the locker may be updated to indicate that the locker is now available.

In some embodiments employing a "smart locker system" (see, e.g., FIG. 2) that is Internet-connected, the access codes for each locker may be controlled by a computing system. Therefore, the customer may not need to interface with the electronic device 130. Rather, the access code may have already been generated and configured by the computing system, and transmitted to the customer, which the customer can use to open the correct locker. For example, the user may enter a code on the electronic lock located on the assigned locker. In some examples, the access code may be stored in the customer's device, which may be read by the locker using near-field communication (NFC) technology.

In various examples, a "dumb locker system" may be used, where the locker system is unconnected to networks such as the Internet. In such examples, each locker may be pre-programmed with an access code that is stored in memory (e.g., memory of the electronic device 130), the access code may be randomly generated so the same code is never re-used. In such a case, the customer may interface with the electronic device 130 by entering in the access password, which causes the electronic device 130 to display the assigned locker and corresponding access code, which the customer may then use to access the assigned locker.

Various embodiments may relate to a computer implemented method for coordinating retrieval of a physical item at a physical location. The method may include receiving order detail information relating to an order that has been placed by a user. The method may include assigning the order to a specific storage compartment in a plurality of storage compartments located at the physical location. The method may include receiving an occupied signal that the physical item has been placed within the assigned specific storage compartment. The method may include updating a storage status of the assigned specific storage compartment to a first storage status, in response to receiving the occupied signal. The method may include transmitting, to a user computing device associated with the user, a request for the user to indicate whether the user is in route to the physical location. The method may include transmitting, to the user computing device associated with the user, an access code for granting access to the assigned specific storage compartment. The method may include receiving an indication that the user is in route to the physical location. The method may include updating the storage status of the assigned specific storage compartment to a second storage status, in response to receiving the indication that the user is in route to the physical location. The method may include displaying a current storage status of the assigned specific storage compartment.

In some examples of a method, the first storage status may include a pending retrieval status, and the second storage status may include a confirmed order status. The method may include updating the storage status of the assigned specific storage compartment to a third storage status, upon a predetermined amount of time passing after updating the storage status of the assigned specific storage compartment to the first storage status. In various examples, the third storage status may include a freshness alert status. In some embodiments, transmitting a request for the user to indicate whether the user is in route to the physical location may include transmitting a short message service (SMS) message to the user device. The method may include transmitting, to the user computing device associated with the user, an access password. The method may include prompting the user to input the access password. The method may include displaying an access code for granting access to the assigned specific storage compartment, in response to inputting the access password.

Some examples of a method may include updating the storage status of the assigned specific storage compartment to a zeroth storage status, upon retrieval of the physical item from the assigned specific storage compartment. In various embodiments, the zeroth storage status may include an available compartment status. The method may include updating the storage status of the assigned specific storage compartment to a fourth storage status, upon a predetermined amount of time has passed after updating the storage status of the assigned specific storage compartment to the second storage status. In some examples, the fourth storage status may include a user no-show status.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments may be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random-access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the member can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from a source to a receiver over a dedicated physical link (e.g., fiber optic link, infrared link, ultrasonic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, FireWire, ATA/IDE, RS-232, RS-422, RS-485, 802.11 a/b/g/n, Wi-Fi, WiFi-Direct, Li-Fi, BlueTooth, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

In various embodiments, a computer system may include non-transitory memory. The memory may be connected to the one or more processors may be configured for encoding data and computer readable instructions, including processor executable program instructions. The data and computer readable instructions may be accessible to the one or more processors. The processor executable program instructions, when executed by the one or more processors, may cause the one or more processors to perform various operations.

In various embodiments, the computer system may include Internet of Things (IoT) devices. IoT devices may include objects embedded with electronics, software, sensors, actuators, and network connectivity which enable these objects to collect and exchange data. IoT devices may be in-use with wired or wireless devices by sending data through an interface to another device. IoT devices may collect useful data and then autonomously flow the data between other devices.

Although various embodiments have been described with reference to the Figures, other embodiments are possible. A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A computer-implemented method performed by one or more processors of a kiosk system associated with a plurality of storage compartments for coordinating retrieval of a physical item at a physical location, comprising:
   receiving order detail information relating to an order that has been placed by a user;
   assigning the order to a specific storage compartment in the plurality of storage compartments located at the physical location;
   receiving an occupied signal that the physical item has been placed within the assigned specific storage compartment;
   in response to receiving the occupied signal, updating a storage status of the assigned specific storage compartment to a first storage status;
   transmitting, to a user computing device associated with the user, a request for the user to directly indicate via an electronic message whether the user is in route to the physical location;
   transmitting, to the user computing device associated with the user, an access password for granting access to the assigned specific storage compartment;
   receiving an indication via the electronic message that the user is in route to the physical location;
   in response to receiving the indication that the user is in route to the physical location, updating the storage status of the assigned specific storage compartment to a second storage status;
   displaying a current storage status of the assigned specific storage compartment;
   receiving the access password from the user;
   in response to receiving the access password, providing an access code associated with the assigned specific storage compartment;
   receiving the access code from the user to the specific storage compartment; and,
   in response to receiving the access code from the user, opening the specific storage compartment.

2. The computer-implemented method of claim 1, wherein the first storage status comprises a pending retrieval status, and the second storage status comprises a confirmed order status.

3. The computer-implemented method of claim 1, further comprising:
   responsive to a passing of a predetermined amount of time after the updating a storage status of the assigned specific storage compartment to a first storage status, updating the storage status of the assigned specific storage compartment to a third storage status.

4. The computer-implemented method of claim 3, wherein the third storage status comprises a freshness alert status based upon a pre-determined freshness expiration period for the physical item.

5. The computer-implemented method of claim 1, wherein transmitting a request for the user to directly indicate via an electronic message whether the user is in route to the physical location comprises transmitting a short message service (SMS) message to the user device.

6. The computer-implemented method of claim 1, further comprising:
   upon retrieval of the physical item from the assigned specific storage compartment, updating the storage status of the assigned specific storage compartment to a zeroth storage status.

7. The computer-implemented method of claim 6, wherein the zeroth storage status comprises an available compartment status.

8. The computer-implemented method of claim 1, further comprising:
   responsive to a passing of a predetermined amount of time after the updating a storage status of the assigned specific storage compartment to a second storage status, updating the storage status of the assigned specific storage compartment to a fourth storage status.

9. The computer-implemented method of claim 8, wherein the fourth storage status comprises a user no-show status.

10. A computer-implemented method performed by one or more processors of a kiosk system associated with a plurality of storage compartments for coordinating retrieval of a physical item at a physical location, comprising:
    assigning an order to a specific storage compartment in the plurality of storage compartments located at the physical location;
    receiving an occupied signal that the physical item has been placed within the assigned specific storage compartment;
    in response to receiving the occupied signal, updating a storage status of the assigned specific storage compartment to a first storage status;
    transmitting, to a user computing device associated with the user, a request for the user to directly indicate via an electronic message whether the user is in route to the physical location;
    receiving an indication via the electronic message that the user is in route to the physical location;

in response to receiving the indication that the user is in route to the physical location, updating the storage status of the assigned specific storage compartment to a second storage status;

in response to receiving a predetermined access password from the user, providing an access code associated with the assigned specific storage compartment;

receiving the access code from the user to the specific storage compartment; and, in response to receiving the access code from the user, opening the specific storage compartment.

11. The computer-implemented method of claim 10, wherein the first storage status comprises a pending retrieval status, and the second storage status comprises a confirmed order status.

12. The computer-implemented method of claim 10, further comprising:

responsive to a passing of a predetermined amount of time after the updating a storage status of the assigned specific storage compartment to a first storage status, updating the storage status of the assigned specific storage compartment to a third storage status.

13. The computer-implemented method of claim 12, wherein the third storage status comprises a freshness alert status based upon a pre-determined freshness expiration period for the physical item.

14. The computer-implemented method of claim 10, wherein transmitting a request for the user to directly indicate via an electronic message whether the user is in route to the physical location comprises transmitting a short message service (SMS) message to the user device.

15. The computer-implemented method of claim 10, further comprising:

upon retrieval of the physical item from the assigned specific storage compartment, updating the storage status of the assigned specific storage compartment to a zeroth storage status.

16. The computer-implemented method of claim 15, wherein the zeroth storage status comprises an available compartment status.

17. The computer-implemented method of claim 10, further comprising:

responsive to a passing of a predetermined amount of time after the updating a storage status of the assigned specific storage compartment to the second storage status, updating the storage status of the assigned specific storage compartment to a fourth storage status.

18. The computer-implemented method of claim 17, wherein the fourth storage status comprises a user no-show status.

19. The computer-implemented method of claim 10, further comprising:

receiving order detail information relating to the order that has been placed by the user.

20. The computer-implemented method of claim 10, further comprising:

displaying a current storage status of the assigned specific storage compartment.

21. The computer-implemented method of claim 10, wherein the occupied signal is generated responsive to user input.

22. The computer-implemented method of claim 10, the method further comprising:

generating a graphical display representing each of the plurality of storage compartments at the storage location, wherein the graphical representation provides a visual indication of a current storage status of each of the plurality of storage compartments; and, updating the graphical display when a current storage status of at least one storage compartment changes.

* * * * *